United States Patent
Okubo

(10) Patent No.: US 8,920,011 B2
(45) Date of Patent: Dec. 30, 2014

(54) VEHICLE HEADLAMP

(71) Applicant: Ichikoh Industries, Ltd., Isehara-shi, Kanagawa-ken (JP)

(72) Inventor: Yasuhiro Okubo, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 49 days.

(21) Appl. No.: 13/683,356

(22) Filed: Nov. 21, 2012

(65) Prior Publication Data

US 2013/0135889 A1 May 30, 2013

(30) Foreign Application Priority Data

Nov. 24, 2011 (JP) ................................ 2011-256718

(51) Int. Cl.
*B60Q 1/04* (2006.01)
*F21S 8/10* (2006.01)

(52) U.S. Cl.
CPC .............. *B60Q 1/04* (2013.01); *F21S 48/1159* (2013.01); *F21S 48/137* (2013.01)
USPC ............................ 362/518; 362/517; 362/538

(58) Field of Classification Search
CPC . F21S 48/1388; F21S 48/145; F21S 48/1159; F21S 48/137; F21S 48/1358; F21S 48/1364; F21S 48/1113; F21S 48/1109; F21S 48/1118; F21S 48/1122; F21V 7/22; F21V 7/04; F21V 7/09; F21V 7/0025; F21V 19/00
USPC .......................... 362/516, 517, 518, 519, 538
See application file for complete search history.

(56) References Cited

U.S. PATENT DOCUMENTS

| 1,550,645 | A | * | 8/1925 | Godley | .......................... 362/348 |
| 5,416,671 | A | * | 5/1995 | Uchida | .......................... 362/518 |
| 2011/0038171 | A1 | | 2/2011 | Uchida | |

FOREIGN PATENT DOCUMENTS

JP 2011-034875 A 2/2011

* cited by examiner

*Primary Examiner* — Y M Lee
(74) *Attorney, Agent, or Firm* — Foley & Lardner LLP

(57) ABSTRACT

The present invention is provided with a semiconductor-type light source 2 and a reflector 3. The reflector 3 has reflection surfaces 31U to 31D. The semiconductor-type light source 2 is disposed at or near a reference focal point F of the reflection surfaces 31U to 31D. The reflection surfaces 31U to 31D are divided into upper and lower sides in a direction in which light is to be radiated from the semiconductor-type light source 2, with respect to an X axis passing through a center O of the semiconductor light source 2 or its proximity. Among the upper and lower reflection surfaces, on the upper side, convergent scattering reflection surfaces 31U to 34U are disposed, and on the lower side, divergent scattering reflection surfaces 31D to 34D are disposed. As a result, the present invention is capable of forming an approximately ideal light distribution pattern HPA for high beam.

5 Claims, 6 Drawing Sheets

VEHICLE HEADLAMP

CROSS REFERENCE TO RELATED APPLICATIONS

This application claims priority of Japanese Patent Application No. 2011-256718 filed on Nov. 24, 2011. The contents of the application are incorporated herein by reference in their entirety.

BACKGROUND OF THE INVENTION

1. Field of the Invention

The present invention relates to a vehicle headlamp that is provided with a semiconductor-type light source and a reflection surface. In other words, the present invention relates to a vehicle headlamp of a landscape placement type of which light emitting chips of a semiconductor-type light source are provided in a reference optical axis direction (in a lateral direction), the vehicle headlamp also serving as a vehicle headlamp of a reflection type (reflector type) of which light from the semiconductor-type light source is reflected on a reflection surface to thereby emit a predetermined light distribution pattern forward of a vehicle.

2. Description of the Related Art

A vehicle headlamp of such type is conventionally known (for example, Japanese Unexamined Patent Application Publication No. 2011-34875). Hereinafter, a conventional vehicle headlamp will be described. The conventional vehicle headlamp is provided with an LED light source, a first reflection surface, and a second reflection surface. The conventional vehicle headlamp is provided in such a manner that light beams from the LED light source are respectively emitted forward of a vehicle as a first partial light distribution pattern that is reflected on the first reflection surface, the pattern having a horizontal cutoff line, and as a second partial light distribution pattern that is reflected on the second reflection surface, the pattern having an oblique cutoff line. In other words, the conventional vehicle headlamp is adapted to emit a light distribution pattern for low beam (a light distribution pattern for passing).

However, the conventional vehicle headlamp is adapted to divide a reflection surface into a first reflection surface that is proximal to the LED light source and a second reflection surface that is distant from the LED light source. Therefore, in the conventional vehicle headlamp, if a light distribution pattern for high beam (a light distribution pattern for cruising) is emitted forward of a vehicle in place of the light distribution pattern for low beam, as shown in FIG. 8, there may be produced a light distribution pattern for high beam HPB (including a high luminous intensity area SPA) that is not transversely symmetrical to an optical axis (a vertical line VU-VD from the top to the bottom of a screen in FIG. 8). As described above, in the conventional vehicle headlamp, it is difficult to form an approximately ideal light distribution pattern for high beam HPA (including a high luminous intensity area SPA) shown in FIG. 7. It is to be noted that the approximately ideal light distribution pattern for high beam HPA, as shown in FIG. 7, is a light distribution pattern for high beam that is substantially transversely symmetrical to the optical axis (the vertical line VU-VD from the top to the bottom of a screen in FIG. 7).

The present invention has been made in order to solve the above described problem that in the conventional vehicle headlamp, it is difficult to form an approximately ideal light distribution pattern for high beam.

SUMMARY OF THE INVENTION

A vehicle headlamp according to a first aspect of the present invention, comprising:
a semiconductor-type light source; and
a reflection surface adapted to reflect light from the semiconductor-type light source and emit the reflected light forward of a vehicle in a predetermined light distribution pattern,
wherein the semiconductor-type light source is disposed at or near a reference focal point of the reflection surface,
wherein the reflection surface is divided into reflection surfaces on upper and lower sides in a direction in which the light from the semiconductor-type light source is to be radiated, with respect to a normal line passing through a center of the semiconductor-type light source or proximity thereof, and
wherein either one of the reflection surfaces on the upper and lower sides is a convergent scattering reflection surface, and the other one is a divergent scattering reflection surface.

The vehicle headlamp according to a second aspect of the present invention, in the first aspect,
wherein among the reflection surfaces on the upper and lower sides, the reflection surfaces on the upper and lower sides that are proximal to the semiconductor-type light source are reflection surfaces adapted to form a light distribution pattern of an entire external shape of the predetermined light distribution pattern,
wherein among the reflection surfaces on the upper and lower sides, the reflection surfaces on the upper and lower sides that are distant from the semiconductor-type light source are reflection surface adapted to form a light distribution pattern of a high luminous intensity area of the predetermined light distribution pattern, and
wherein among the reflection surfaces on the upper and lower sides, the reflection surfaces on the upper and lower sides between the upper reflection surfaces that are proximal to the semiconductor-type light source and the upper and lower reflection surfaces that are distant from the semiconductor-type light source are reflection surfaces on which a ratio of forming the light distribution pattern of the high luminous intensity area increases from a ratio of forming the light distribution pattern of an entire external shape as the reflection surfaces are distant from the semiconductor-type light source.

The vehicle headlamp according to a third aspect of the present invention, in the first aspect,
wherein the reflection surfaces on the upper and lower sides are divided into a plurality of segments in such a manner as to be perpendicular to the normal line,
wherein among the plurality of segments, the reflection surfaces on the upper and lower sides of a segment that is the most proximal to the semiconductor-type light source are reflection surfaces adapted to form a light distribution pattern of an entire external shape of the predetermined light distribution pattern,
wherein among the plurality of segments, the reflection surfaces on the upper and lower sides of a segment that is the most distant from the semiconductor-type light source are reflection surfaces adapted to form a light distribution pattern of a high luminous intensity area of the predetermined light distribution pattern, and
wherein among the plurality of segments, the reflection surfaces on the upper and lower sides of a segment between the segment that is the most proximal to the semiconductor-type light source and the segment that is the most distant from the semiconductor-type light source are reflection surfaces adapted to form an intermediate light distribution pattern connecting the light distribution pattern of the entire external shape and the light distribution pattern of the high luminous intensity area to each other.

The vehicle headlamp according to a fourth aspect of the present invention, in the third aspect, wherein either one of the reflection surfaces on the upper and lower sides of the plurality of segments is a convergent scattering reflection surface in all of the segments, and the other one is a divergent scattering reflection surface in all of the segments.

A vehicle headlamp according to the first aspect of the present invention is provided in such a manner that a partial light distribution pattern of a light distribution pattern for high beam, which is reflected and formed on a convergent scattering reflection surface that is either one of upper and lower reflection surfaces, and a partial light distribution pattern of a light distribution pattern for high beam, which is reflected and formed on a divergent scattering reflection surface that is the other one of the upper and lower reflection surfaces, are substantially transversely symmetrical to each other. Therefore, the vehicle headlamp according to the first aspect of the present invention is capable of reliably form an approximately ideal light distribution pattern that is substantially transversely symmetrical to an optical axis by superimposing (combining) a partial light distribution pattern of a light distribution pattern for high beam, which is reflected and formed on a convergent scattering reflection surface that is either one of upper and lower reflection surfaces, and a partial light distribution pattern of a light distribution pattern for high beam, which is reflected and formed on a divergent scattering reflection surface of the other one of the upper and lower reflection surfaces, with each other.

A vehicle headlamp according to the second aspect of the present invention is provided in such a manner that a solid angle of light from a semiconductor-type light source, which is incident to upper and lower reflection surfaces that are proximal to the semiconductor-type light source, is great, and therefore, it is optimal to form a light distribution pattern of an entire external shape of a predetermined light distribution pattern by significantly scattering the light from the semiconductor-type light source on the upper and lower reflection surfaces. In addition, the vehicle headlamp according to the second aspect of the present invention is provided in such a manner that a solid angle of light from a semiconductor-type light source, which is incident to upper and lower reflection surfaces that are distant from the semiconductor-light source, is small in comparison with the solid angle of the light from the semiconductor-type light source, which is incident to the upper and lower reflection surfaces that are proximal to the semiconductor-type light source; and therefore, it is optimal to form a light distribution pattern of a high luminous intensity area of a predetermined light distribution pattern by less significantly scattering and concentrating the light from the semiconductor-type light source on the upper and lower reflection surfaces. Further, the vehicle headlamp according to a second aspect of the present invention is provided in such a manner that a slid angle of light from a semiconductor-type light source, which is incident to upper and lower reflection surfaces between upper and lower reflection surfaces that are proximal to the semiconductor-type light source and upper and lower reflection surfaces that are distant from the semiconductor-type light source, is small in comparison with a solid angle of the light from the semiconductor-type light source, which is incident to the upper and lower reflection surfaces that are proximal to the semiconductor-type light source, and is great in comparison with a solid angle of the light from the semiconductor-type light source, which is incident to the upper and lower reflection surfaces that are distant from the semiconductor-type light source; and therefore, it is optimal to form an intermediate light distribution pattern connecting a light distribution pattern of an entire external shape and a light distribution pattern of a high luminous intensity area to each other by scattering the light from the semiconductor-type light source on the upper and lower reflection surfaces in such a manner as to be less significant than the light distribution pattern of the entire external shape and as to be significant than the light distribution pattern of the high luminous intensity area.

A vehicle headlamp according to the third aspect of the present invention is provided in such a manner that, as is the case with the vehicle headlamp of the second aspect of the invention, a solid angle from light from a semiconductor-type light source, which is incident to upper and lower reflection surfaces of a segment that is the most proximal to the semiconductor-type light source is great; and therefore, it is optimal to form a light distribution pattern of an entire external shape of a predetermined light distribution pattern by significantly scattering the light from the semiconductor-type light source on the upper and lower reflection surfaces of that segment. In addition, the vehicle headlamp according to the third aspect of the present invention is provided in such a manner that a solid angle of light from a semiconductor-type light source, which is incident to upper and lower reflection surfaces of a segment that is the most distant from the semiconductor-type light source, is small in comparison with a solid angle of the light from the semiconductor-type light source, which is incident to the upper and lower reflection surfaces that are the most proximal to the semiconductor-type light source; and therefore, it is optimal to form a light distribution pattern of a high luminous intensity area of a predetermined light distribution pattern by less significantly scattering and concentrating the light from the semiconductor-type light source on the upper and lower reflection surfaces of that segment. Further, the vehicle headlamp according to the third aspect of the present invention is provided in such a manner that a solid angle of light from a semiconductor-type light source, which is incident to upper and lower reflection surfaces of a segment between upper and lower reflection surfaces of a segment that is the most proximal to the semiconductor-type light source and upper and lower reflection surfaces of a segment that is the most proximal to the semiconductor-type light source, is small in comparison with a solid angle of the light from the semiconductor-type light source, which is incident to the upper and lower reflection surfaces of the segment that is the most distant from the semiconductor-type light source, and is great in comparison with a solid angle of the light from the semiconductor-type light source, which is incident to the upper and lower reflection surfaces that are the most distant from the semiconductor-type light source; and therefore, it is optimal to form an intermediate light distribution pattern connecting a light distribution pattern of an entire external shape and a light distribution pattern of a high luminous intensity area to each other by scattering the light from the semiconductor-type light source on the upper and lower reflection surfaces of that segment in such a manner as to be less significant than the light distribution pattern of the entire external shape and in such a manner as to be significant than the light distribution pattern of the high luminous intensity area.

A vehicle headlamp according to the fourth aspect of the present invention is provided in such a manner that either one of the upper and lower reflection surfaces of a plurality of segments is a convergent scattering reflection surface in a respective one of the segments, and the other side is a divergent scattering reflection surface in a respective one of the segments; and therefore, reflection surfaces of the plurality of segments adjacent to each other in a normal direction (a transverse direction) are continuous as a convergent scattering reflection surface or a divergent scattering reflection surface. Accordingly, the vehicle headlamp according to the fourth aspect of the present invention is capable of smoothly and continuously configuring a plurality of segments without a loss of light from a semiconductor-type light source.

DESCRIPTION OF THE PREFERRED EMBODIMENTS

Figure 1:
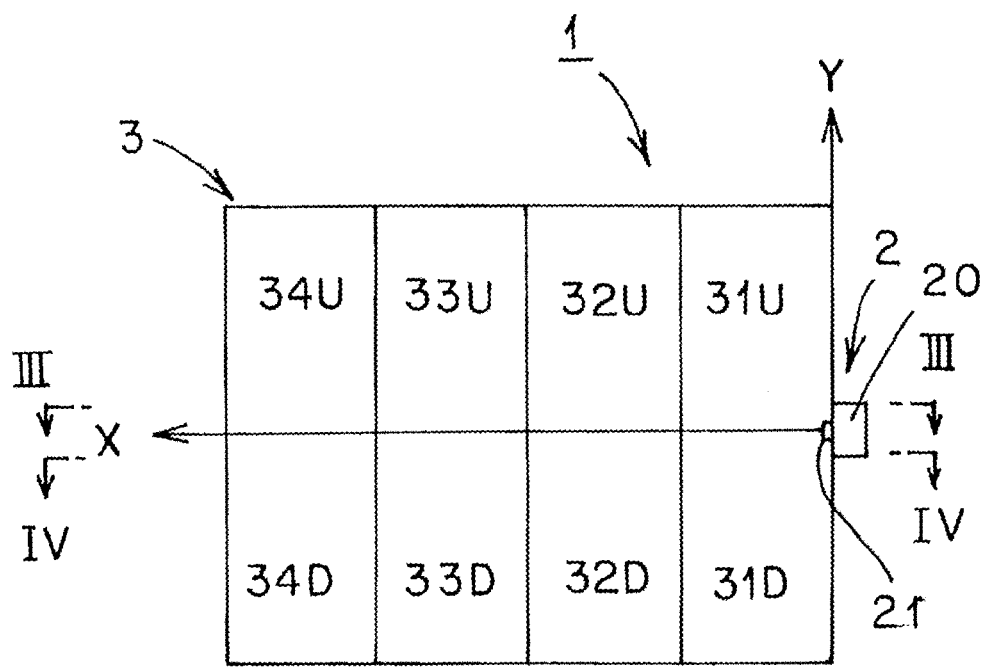
FIG. 1 is a schematic front view of essential portions showing an embodiment of a vehicle headlamp according to the present invention.

Hereinafter, the preferred embodiments of a vehicle headlamp according to the present invention will be described in detail with reference to the drawings. It is to be noted that the present invention is not limited by the embodiments. In FIG. 5 to FIG. 8, reference code "VU-VD" designates a vertical line from the top to bottom of a screen. Reference code "HL-HR" designates a horizontal line from the left to right of the screen. In addition, FIG. 5 to FIG. 7 each are explanatory views that are graphically depicted by means of computer simulation, respectively. Further, in FIG. 3 and FIG. 4 each, hatching of a cross section of a reflector is not shown. It is to be noted that in the present specification and claims, the terms "top, bottom, front, rear, left, and right" designate the top, bottom, front, rear, left, and right of a vehicle when a vehicle headlamp according to the present invention is mounted on the vehicle (automobile).

(Description of Configuration)

Hereinafter, a configuration of a vehicle headlamp in the embodiment will be described. A vehicle headlamp 1 in the embodiment is a vehicle headlamp for high beam adapted to emit an approximately ideal light distribution pattern HPA for high beam shown in FIG. 7 (including a high luminous intensity area SPA) forward of a vehicle, i.e., a headlamp. The vehicle headlamp 1 is a vehicle headlamp that is to be mounted on a left side (or a right side) of a vehicle, although not shown. The vehicle headlamp that is to be mounted on the right side (or the left side) of a front part of the vehicle is substantially transversely reversed in disposition of a semiconductor-type light source and a reflection surface of the vehicle headlamp 1 in the embodiment. Therefore, a description of the vehicle headlamp that is to be mounted on the right side (or the left side) of the front part of the vehicle is not given here.

The vehicle headlamp 1 is provided with: a semiconductor-type light source 2; a reflector 3 that has reflection surfaces 31U, 32U, 33U, 34U, 31D, 32D, 33D, and 34D;

a lamp housing (not shown); and a lamp lens (not shown). The semiconductor-type headlamp 2 and the reflector 3 configure a headlamp unit. The lamp housing and the lamp lens (a so called outer cover) define a lamp room (not shown). The headlamp unit (the semiconductor-type light source 2 and the reflector 3) are disposed in the lamp room in such a manner as to be adjustable on an optical axis via an optical light adjustment mechanism (not shown). It is to be noted that in the lamp room, a lamp unit other than the headlamp unit (the semiconductor-type light source 2 and the reflector 3), such as a front clearance lamp unit, a front turn signal lamp, or a daytime running lamp, for example, may be disposed.

The semiconductor-type light source 2 is mounted on at least one of the lamp housing and the reflector 3 via a heat sink member (not shown). The semiconductor-type light source 2, in this exemplary embodiment, uses a self-emitting semiconductor type light source such as an LED or an EL (an organic EL), for example, (an LED in this exemplary embodiment). The semiconductor-type light source 2 is made of: a substrate 20; a light emitting chip 21 that is provided on the substrate 20; and a sealing resin member (not shown) adapted to seal the light emitting chip 21. The semiconductor-type light source 2 is mounted on the head sink member by means of a mount member (not shown). The light emitting chip 21 of the semiconductor-type light source 2 is adapted to emit light when a current is supplied via the mount member and the substrate 20.

Figure 2:
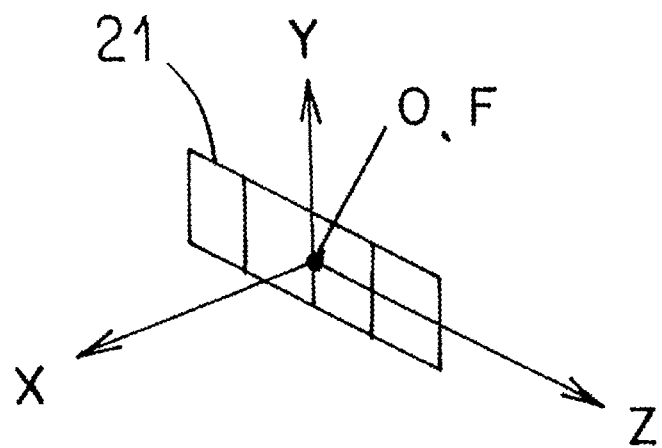
FIG. 2 is an explanatory view showing light emitting chips of a semiconductor-type light source.

The light emitting chip 21, as shown in FIG. 2, is formed in a planar rectangular shape (a flat rectangular shape). In other words, four square chips are arranged in an X direction of a reference optical axis Z of the reflection surfaces 31U to 34D. It is to be noted that one rectangular chip or one square chip may be used. A center O of the light emitting chip 21 is positioned at or near a reference focal point F of the reflection surfaces 31U to 34U, and is positioned on or near the reference optical axis Z of the reflection surfaces 31U to 34D. A light emission surface of the light emitting chip 21 is oriented to a right side in the embodiment.

In FIG. 2, X, Y, and Z axes configure a quadrature coordinate (an X-Y-Z quadrature coordinate system). The X axis corresponds to a normal line (a perpendicular line) passing through the center O of the light emitting chip 21 or its proximity, in other words, a horizontal axis in a transverse direction passing through the center O of the light emitting chip 21 or its proximity, and in the embodiment, a right side corresponds to a positive direction, and a left side corresponds to a negative direction. In addition, the Y axis corresponds to a vertical axis in a vertical direction passing through the center O of the light emitting chip 21 or its proximity, and in the embodiment, an upper side corresponds to a positive direction, and a lower side corresponds to a negative direction. Further, the Z axis corresponds to a reference optical axis Z of the reflection surfaces 31U to 34D, in other words, a horizontal axis in a forward/backward direction passing through the center O of the light emitting chip 21 or its proximity, and in the embodiment, a front side corresponds to a positive direction, and a rear side corresponds to a negative direction.

An interior surface of the reflector 3, in other words, a surface that is opposite to the light emission surface of the light emitting chip 21 is the one on which the reflection surfaces 31U to 34D of a parabolic system, for example, those of free curved surfaces (NURBS curved surfaces) are provided.

Figure 3:
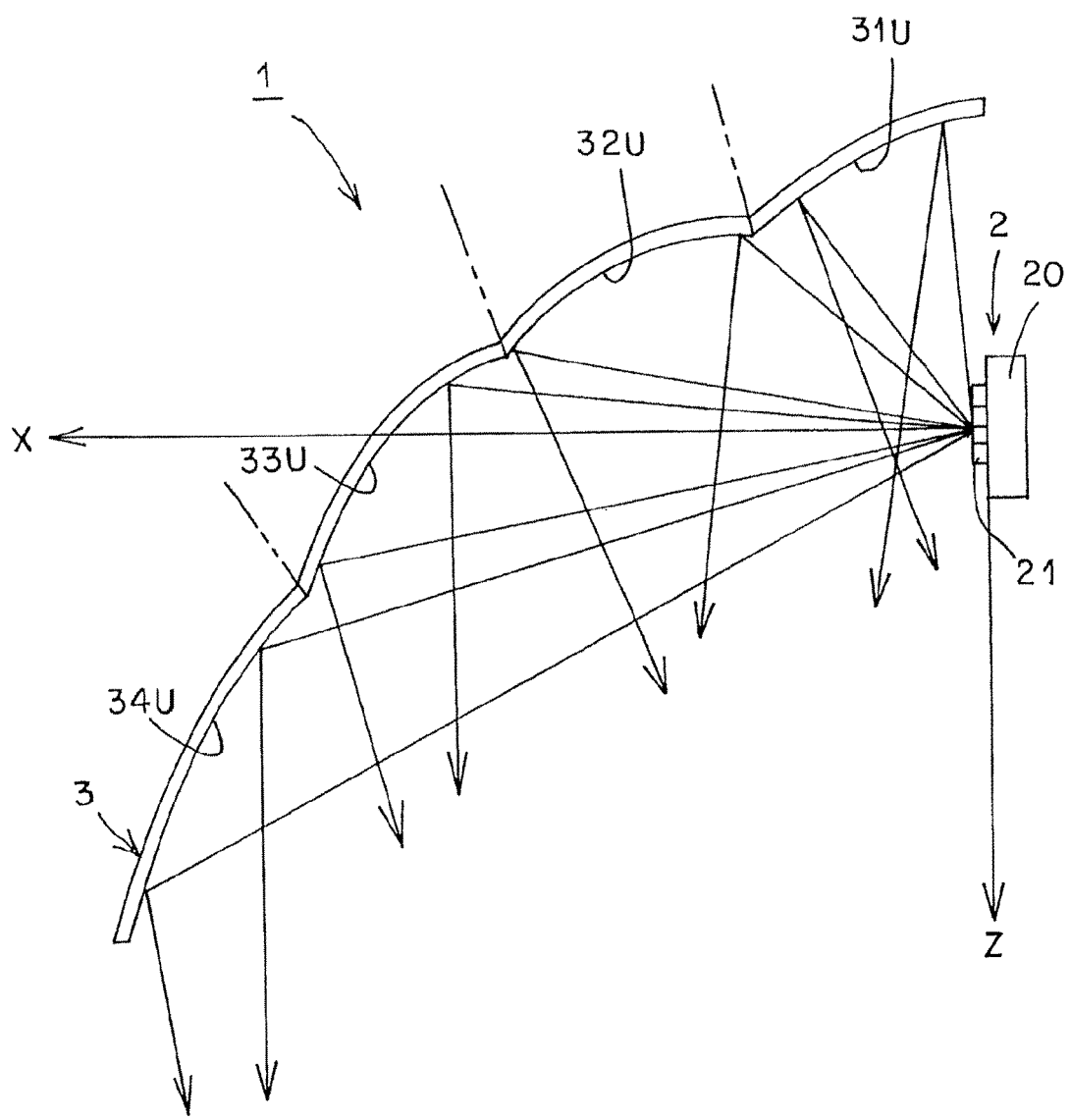
FIG. 3 is a sectional, schematic, and explanatory view taken along the line III-III in FIG. 1.
Figure 4:
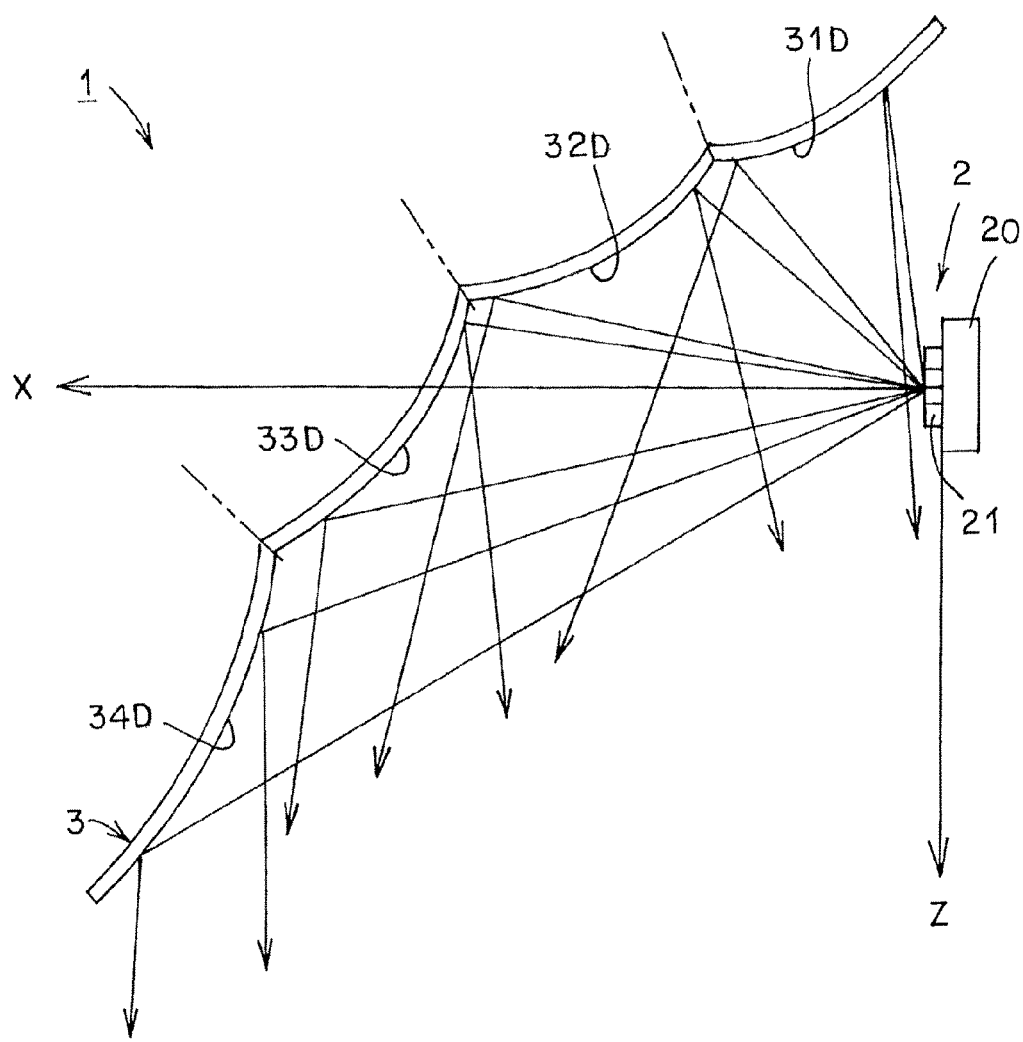
FIG. 4 is a sectional, schematic explanatory view taken along the line IV-IV in FIG. 1.
Figure 5:
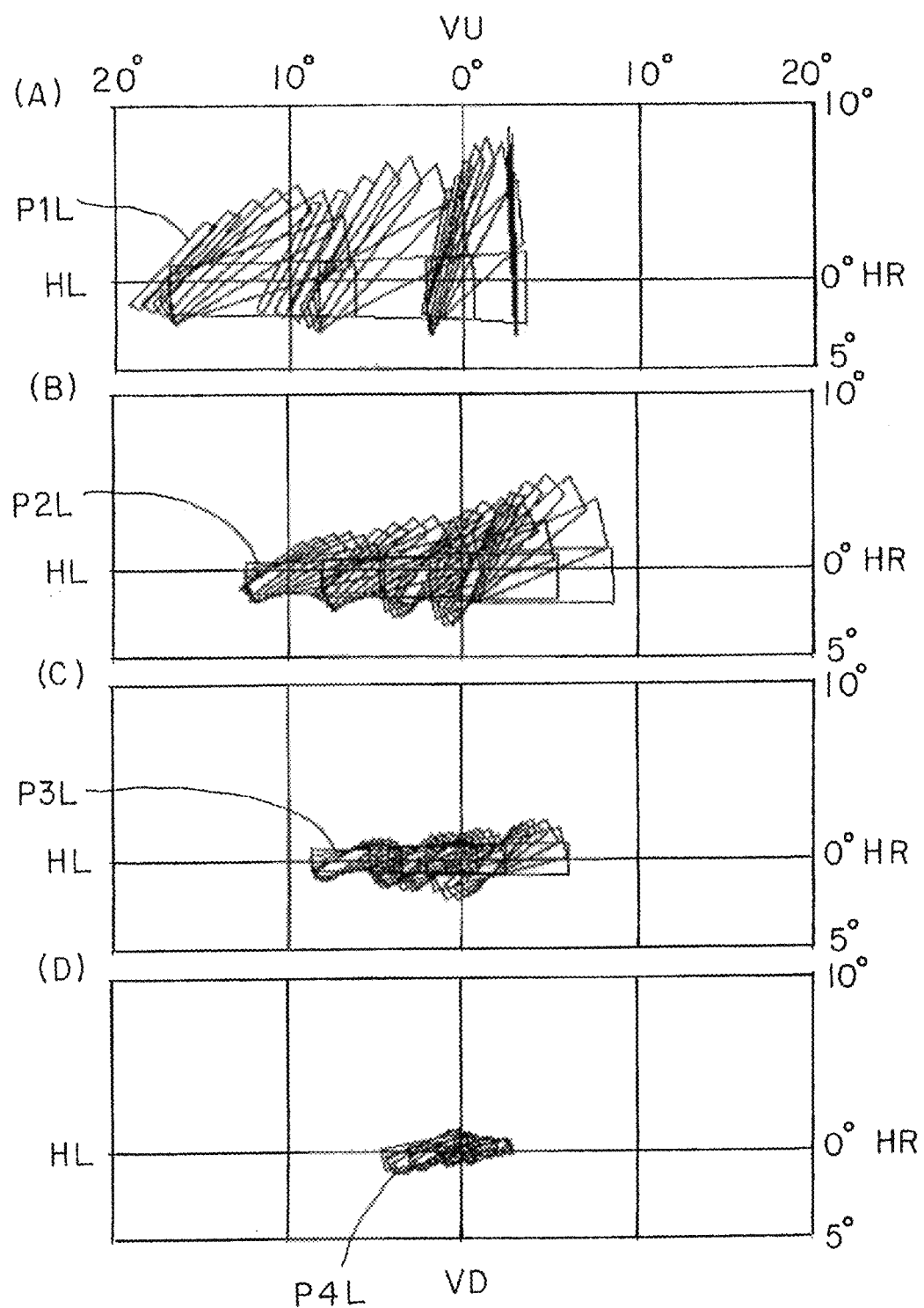
FIG. 5 is an explanatory view showing a groups of reflected images of light emitting chips that are reflected from a convergent scattering reflection surface on an upper side and then are emitted on a screen.

The reflection surfaces 31U to 34D, as shown in FIG. 1, FIG. 3, and FIG. 4, are divided into upper reflection surfaces 31U, 32U, 33U, and 34U and lower reflection surfaces 31D, 32D, 33D, and 34D with respect to the X axis or its proximity. In other words, the reflection surfaces 31U to 34D, as shown in FIG. 1, FIG. 3, and FIG. 4, are divided into upper and lower sides in a direction (a positive direction of the X axis) in which light from the semiconductor-type light source 2 (refer to the arrow drawn by the solid line in FIG. 3 and FIG. 4) is to be radiated, with respect to a normal line passing through the center O of the semiconductor-type light source 2 or its proximity. The reflection surfaces 31U to 34D, as shown in FIG. 1, are divided into two segments on upper and lower sides, in other words, an upper segment (upper reflection surfaces 31U to 34U) and a lower segment (lower reflection surfaces 31D to 34D) with respect to the X axis (a normal line).

The upper and lower reflection surfaces 31U to 34D are vertically divided into a plurality of segments, in this example, four segments with respect to the normal line (the X axis or its periphery). In other words, the upper and lower reflection surfaces 31U to 34D are divided into: first reflection surfaces 31U and 31D on the upper and lower sides of a first segment; second reflection surfaces 32U and 32D on the upper and lower sides of a second segment; third reflection surfaces 33U and 33D on the upper and lower sides of a third segment; and fourth reflection surfaces 34U and 34D on the upper and lower sides of a fourth segment. As a result, the reflection surfaces 31U to 34D are vertically and transversely divided into a total of eight segments. It is to be noted that the double-dotted chain lines in FIG. 3 and FIG. 4 each designate boundaries between four segments adjacent to each other in the normal direction (the transverse direction) of the X-axis direction.

Either one of the upper and lower reflection surfaces 31U to 34D of the four segments is a convergent scattering reflection surface, and the other one is a divergent scattering reflection surface. In this example, among the upper and lower reflection surfaces 31U to 34D of the four segments, the upper reflection surfaces 31U to 34U are convergent scattering reflection surfaces in all of the four segments, and the lower reflection surfaces 31D to 34D are divergent scattering reflection surfaces in all of the four segments.

Among the four segments, the upper and lower first reflection surfaces 31U and 31D of the first segment that is the most proximal to the semiconductor-type light source 2, as shown in FIG. 5(A) and FIG. 6(A), are reflection surfaces that form light distribution patterns P1L and P1R of an entire external shape of the light distribution pattern HPA for high beam.

Among the four segments, the fourth reflection surfaces 34U and 34D on the upper and lower sides of the fourth segment that is the most distant from the semiconductor-type light source 2, as shown in FIG. 5(D) and FIG. 6(D), are reflection surfaces that form light distribution patterns P4L and P4R of a high luminous intensity area SPA of the light distribution pattern HPA for high beam.

Figure 6:
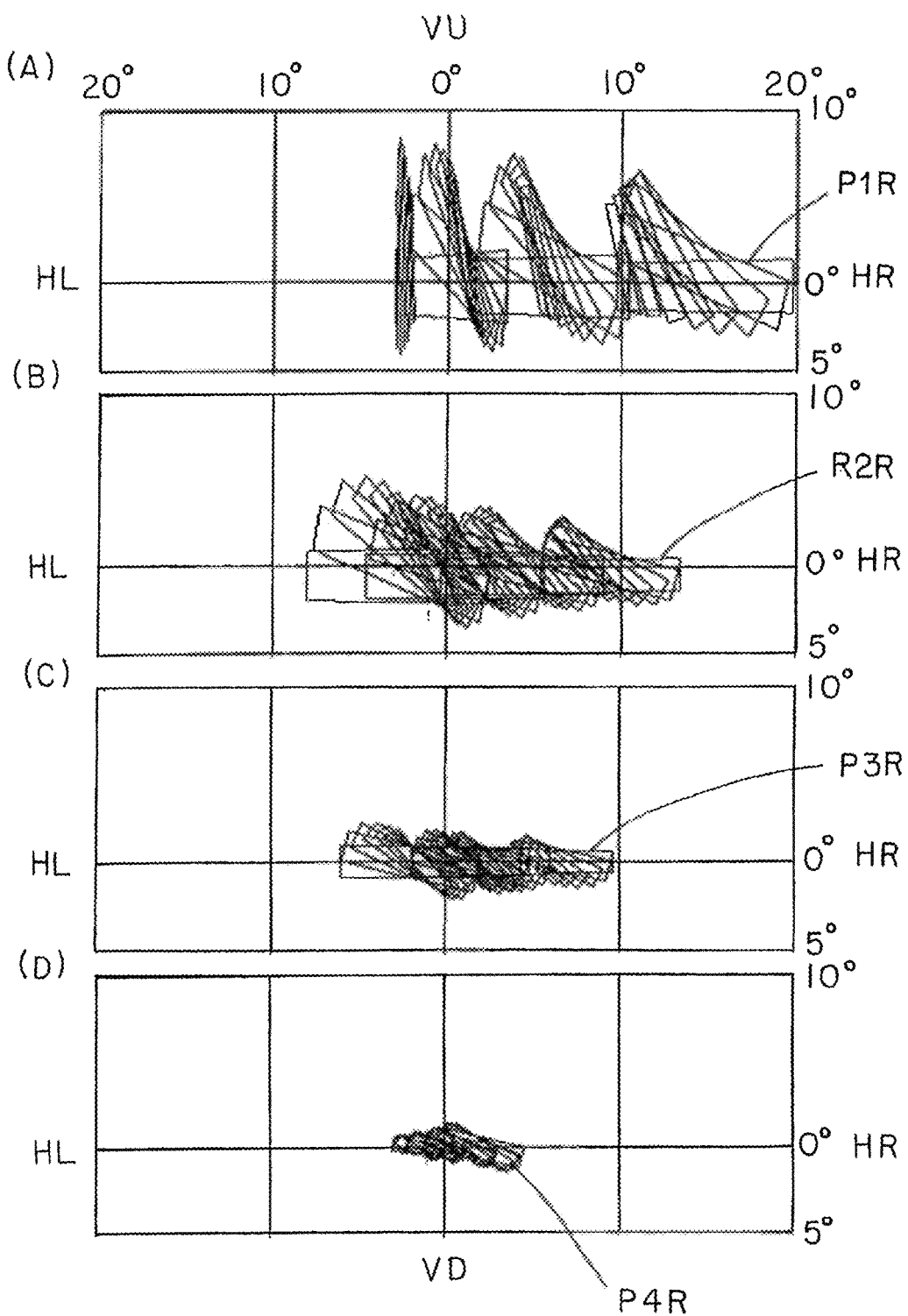
FIG. 6 is an explanatory view showing a groups of reflected images of light emitting chips that are reflected from a divergent scattering reflection surface on a lower side and then are emitted on a screen.

Among the four segments, the upper and lower reflection surfaces 32U and 32D of the second segment and the upper and lower third reflection surfaces 33U and 33D of the third segment between the first segment that is the most proximal to the semiconductor-type light source 2 and the fourth segment that is the most distant from the semiconductor-type light source 2, as shown in FIG. 5(B) an FIG. 5(C) and FIG. 6 (B) and FIG. 6(C), are reflection surfaces adapted to form intermediate light distribution patterns P2L, P3L, P2R, and P3R connecting the light distribution patterns P1L and P1R of the entire external shape and the light distribution patterns P4L and P4R of the high luminous intensity area to each other.

The upper and lower second reflection surfaces 32U and 32D of the second segment and the upper and lower third reflection surfaces 33U and 33D of the third segment are reflection surfaces on which a ratio of forming the light distribution patterns P4L and P4R of a high luminous intensity area SPA increases from a ratio of forming the light distribution patterns P1L and P1R of the entire external shape as the segments are distant from the semiconductor-type light source 2. In other words, the second reflection surfaces 32U and 32D on the upper and lower sides of the second segment are reflection surfaces on which the ratio of forming the light distribution patterns P1L and P1R of the entire external shape is higher than the ratio of forming the light distribution patterns P4L and P4R of the high luminous intensity area SPA in comparison with the third reflection surfaces 33U and 33D on the upper and lower sides of the third segment. Conversely, the upper and lower third reflection surfaces 33U and 33D of the third segment are reflection surfaces on which the ratio of forming the light distribution patterns P4L and P4R of the high luminous intensity area SPA is higher than the ratio of forming the light distribution patterns P1L and P1R of the entire external shape in comparison with the upper and lower second reflection surfaces 32U and 32D of the second segment.

(Description of Functions)

The vehicle headlamp according to the embodiment is made of the constituent elements as described above, and hereinafter, its related functions will be described.

The light emitting chip 21 of the semiconductor-type light source 2 is lit to emit light. The light that is radiated from the light emitting chip 21, as indicated by the arrow drawn by the solid line in FIG. 3 and FIG. 4, is then reflected on the reflection surfaces 31U to 34D of a reflector 3. The thus reflected light is emitted forward of a vehicle as a predetermined light distribution pattern, in other words, as an approximately ideal light distribution pattern HPA for high beam (including the high luminous intensity area SPA) shown in FIG. 7.

Here, reflection light to be reflected on the reflection surfaces 31U to 34D of the reflector 3 will be described in further detail.

First of all, reflected light, in other words, the light that has been reflected in the first reflection surface 31U on the first segment, as indicated by a groups of reflected images of the light emitting chip 21 in FIG. 5(A), is emitted forward of a vehicle as a light distribution pattern P1L of an entire external shape that is substantially half or more of the left side of the light distribution pattern HPA for high beam. A majority of the groups of reflected images that are obtained by the first reflection surface 31U on the upper side of the first segment (in other words, on the reflection surface 31U that is the most proximal to the light emitting chip 21 and that is upper with respect to the X axis) is characterized in that the upper side tilts to the inside (the center side or the right side) and the lower side tilt to the outside (the left side), as shown in FIG. 5(A). The groups of reflected images are optimal in entire shape on the left side of the entire shape (a reversed V shape or a wide-angled, reversed V shape like Mount Fuji) of an approximately ideal light distribution pattern HPA for high beam (including the high luminous intensity area SPA) shown in FIG. 7, in other words, in entire shape in which the upper side tilts from the inside (the center side or the right side) to the outside (the left side) and the lower side are substantially horizontal from the side (the center side or the right side) to the outside (the left side).

Next, reflected light, in other words, the light that has been reflected in the second reflection surface 32U on the second segment, as indicated by the groups of reflected images of the light emitting chip 21 of FIG. 5(B), is emitted forward of a vehicle as an intermediate light distribution pattern P2L having a high ratio of forming a light distribution pattern P1L of an entire external shape that is substantially half or more of the left side of the light distribution pattern HPA for high beam. A majority of the groups of reflected images that are obtained by the second reflection surface 32U on the second segment is characterized in that the upper side tilts to the inside (the center side or the right side) and the lower side tilts to the outside (the left side) as is substantially the case with the majority of the groups of reflected images that are obtained by the first reflection surface 31U on the first segment mentioned previously. The groups of reflected images that are obtained by the second reflection surface 32U on the second segment are more likely to collect light than the groups of reflected images that are obtained by the first reflection surface 31U on the first segment mentioned previously.

Further, reflected light, in other words, the light that has been reflected in the third reflection surface 33U on the third segment, as indicated by the groups of reflected images of the light emitting chip 21 of FIG. 5(C), is emitted forward of a vehicle as an intermediate light distribution pattern P4L which has a high ratio of forming a light distribution pattern P3L of a high luminous intensity area SPA that is substantially half or more of the left side of the light distribution pattern HPA for high beam. A majority of the groups of reflected images that are obtained by the third reflection surface 33U on the third segment is characterized in that the upper side tilts to the inside (the center side or the right side) and the lower side tilts to the outside (the left side), as is substantially the case with the majority of the groups of reflected images that are obtained by the second reflection surface 32U on the second segment mentioned previously. The groups of reflected images that are obtained by the third reflection surface 33U on the third segment are more likely to collect light more than the groups of reflected images that are obtained by the second reflection surface 32U on the second segment mentioned previously.

Furthermore, reflected light, in other words, the light that has been reflected in the third reflection surface 34U on the fourth segment, as indicated by the groups of reflected images of the light emitting chip 21 of FIG. 5(D), is emitted forward of a vehicle as a light distribution pattern P4L of a high luminous intensity area SPA that is substantially half or more on the left side of the light distribution pattern HPA for high beam. A majority of the groups of reflected images that are obtained by the fourth reflection surface 34U on the fourth segment (in other words, the refection surface 34U that is the most distant from the light emitting chip 21 and that is upper with respect to the X axis) is characterized in that the upper side tilts to the inside (the center side or the right side) and the lower side tilts to the outside (the left side), as is substantially the case with a majority of the groups of reflected images that are obtained by the third reflection surface 33U on the third segment mentioned previously. The groups of reflected images that are obtained by the fourth reflection surface 34U on the fourth segment are more likely to collect light more than the groups of reflected images that are obtained by the third reflection surface 33U on the third segment mentioned previously.

It is to be noted that a portion on the right side (HR) of a respective one of the light distribution patterns P1L to P4L shown in FIG. 5(A) to FIG. 5(D) is formed by means of reflected light, in other words, the light that has been reflected in a portion that is proximal to the light emitting chip 21 of the semiconductor-type light source 2 of a respective one of the upper convergent scattering reflection surfaces 31U to 34U of the four segments of the reflector 3 shown in FIG. 3. In addition, it is to be noted that a portion on the left side (HL) of a respective one of the light distribution patterns P1L to P4L shown in FIG. 5(A) to FIG. 5(D) is formed by means of the reflected light having been reflected in a portion that is distant from the light emitting chip 21 of the semiconductor-type light source 2 of a respective one of the upper convergent scattering reflection surfaces 31U to 34U of the four segments of the reflector 3 shown in FIG. 3.

On the other hand, reflected light, in other words, the light that has been reflected in the lower first reflection surface 31D of the first segment, as indicated by the groups of reflected images of the light emitting chip 21 of FIG. 6(A), is emitted forward of a vehicle as a light distribution pattern P1R of an entire external shape that is substantially half or more on the right side of the light distribution pattern HPA for high beam. A majority of the groups of reflected images that are obtained by the first reflection surface 31D on the lower side of the first segment (the reflection surface 31D that is the most proximal to the light emitting chip 21 and that is lower with respect to the X axis) is characterized in that the upper side tilts to the inside (the center side or the left side) and the lower side tilts to the outside (the right side), as shown in FIG. 6(A). The groups of reflected image is optimal in entire shape on the right side of the entire shape (a reversed V shape or a wide-angled, reversed V shape like Mount Fuji) of an approximately ideal light distribution pattern HPA for high beam (including the high luminous intensity area SPA) shown in FIG. 7, in other words, in entire shape in which the upper side tilts from the inside (the center side or the left side) to the outside (the right side) and the lower side are substantially horizontal from the inside (the center side or the left side) to the outside (the right side). In addition, the majority of the groups of reflected images that are obtained by the first reflection surface 31D on the lower side of the first segment and the majority of the groups of reflected images that are obtained by the first reflection surface 31U on the upper side of the first segment mentioned previously are substantially transversely symmetrical to the vertical line VU-VD from the top to the bottom of a screen.

Next, reflected light, in other words, the light that has been reflected in the second reflection surface 32D on the lower side of the second segment, as indicated by the groups of reflection images of the light emitting chip 21 of FIG. 6(B), is emitted forward of a vehicle as an intermediate light distribution pattern P2R having a high ratio of forming a light distribution pattern P1R of an entire external shape that is substantially half or more on the right side of the light distribution pattern HPA for high beam. A majority of the groups of reflected images that are obtained by the second reflection surface 32D on the lower side of the second segment is characterized in that the upper side tilts to the inside (the center side or the left side) and the lower side tilts to the outside (the right side) as is substantially the case with the majority of the groups of reflected images that are obtained by the first reflection surface 31D on the lower side of the first segment mentioned previously. The groups of reflected images that are obtained by the second reflection surface 32D on the lower side of the second segment are more likely to collect light more than the groups of reflected images that are obtained by the first reflection surface 31D on the lower side of the first segment mentioned previously. In addition, the majority of the groups of reflected images that are obtained by the second reflection surface 32D on the lower side of the second segment and the majority of the groups of reflected images that are obtained by the second reflection surface 32U on the upper side of the second segment mentioned previously are substantially transversely symmetrical to the vertical line VU-VD from the top to the bottom of a screen.

Further, reflected light, in other words, the light that has been reflected in the third reflection surface 33D on the lower side of the third segment, as indicated by the groups of reflected images of the light emitting chip 21 of FIG. 6(C), is emitted forward of a vehicle as an intermediate light distribution pattern P3R having a high ratio of forming a light distribution pattern P4R of the high luminous intensity area SPA that is substantially half or more of the light distribution pattern for high beam HPA. A majority of the groups of the reflected images that are obtained by the third reflection surface 33D on the lower side of the third segment is characterized in that the upper side tilts to the inside (the center side or the left side) and the lower side tilts to the outside (the right side), as is substantially the case with the majority of the groups of reflected images that are obtained by the second reflection surface 32D on the lower side of the second segment mentioned previously. The groups of reflected images that are obtained by the third reflection surface 33D on the lower side of the third segment is more likely to collect light than the groups of reflected images that are obtained by the second reflection surface 32D on the lower side of the second segment mentioned previously. In addition, the majority of the groups of reflected images that are obtained by the third reflection surface 33D on the lower side of the third segment and the majority of the groups of reflected images that are obtained by the third reflection surface 33U on the upper side of the third segment mentioned previously are substantially transversely symmetrical to the vertical line VU-VD from the top to the bottom of a screen.

Lastly, reflected light, in other words, the light that has been reflected in the third reflection surface 34D on the lower side of the fourth segment, as indicated by the groups of reflected images of the light emitting chip 21 of FIG. 6(D), is emitted forward of a vehicle as a light distribution pattern P4R of the high luminous intensity area SPA that is substantially half or more on the right side of the light distribution pattern HPA for high beam. A majority of the groups of reflected images that are obtained by the fourth lower reflection surface 34D of the fourth segment (in other words, the lower reflection surface 34D that is the most distant from the light emitting chip 21 and that is lower with respect to the X axis) is characterized in that the upper side tilts to the inside (the center side or the left side) and the lower side tilts to the outside (the right side) as is substantially the case with the majority of the groups of reflected images that are obtained by the third reflection surface 33D on the lower side of the third segment mentioned previously. The groups of reflected images that are obtained by the fourth lower reflection surface 34D of the fourth segment are more likely collect light more than the groups of reflected images that are obtained by the third reflection surface 33D on the lower side of the third segment mentioned previously. In addition, the majority of the groups of reflected images that are obtained by the fourth lower reflection surface 34D of the fourth segment and the majority of the groups of reflected images that are obtained by the fourth reflection surface 34U on the upper side of the fourth segment mentioned previously are substantially transversely symmetrical to the vertical line VU-VD from the top to the bottom of a screen.

It is to be noted that a portion on the left side (HL) of a respective one of the light distribution patterns P1R to P4R shown in FIG. 6(A) to FIG. 6(D) is formed by means of the reflected light, in other words, the light that has been reflected in a portion that is proximal to the light emitting chip 21 of the semiconductor-type light source 2 on the lower side of a respective one of the divergent scattering reflection surfaces 31D to 34D of the four segments of the reflector 3 shown in FIG. 4. In addition, it is to be noted that a portion on the right side (HR) of a respective one of the light distribution patterns P1R to P4R shown in FIG. 6(A) to FIG. 6(D) is formed by means of reflected light having been reflected in a portion that is distant from the light emitting chip 21 of the semiconductor-type light source 2 of a respective one of the divergent scattering reflection surfaces 31D to 34D of the four segments on the lower side of the reflector 3 shown in FIG. 4.

(Description of Advantageous Effects)

The vehicle headlamp according to the embodiment is made of the constituent elements and functions as described above, and hereinafter, its related advantageous effects will be described.

Figure 7:
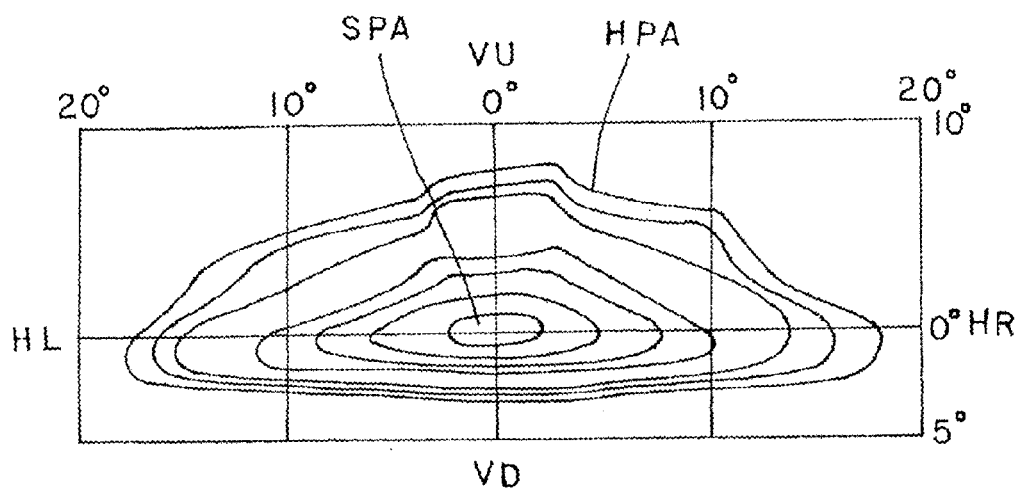
FIG. 7 is an explanatory view showing an approximately ideal light distribution pattern for high beam.
Figure 8:
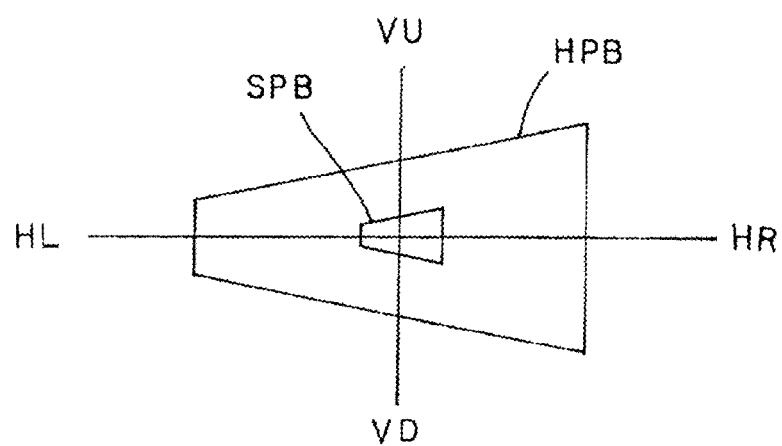
FIG. 8 is an explanatory view showing a light distribution pattern for high beam that is obtained by means of a conventional vehicle headlamp.

The vehicle headlamp 1 in the embodiment is provided in such a manner that partial light distribution patterns P1L to P4L of the light distribution pattern HPA for high beam, which are reflected and formed on the convergent scattering reflection surfaces 31U to 34U of the four segments on the upper side of the reflector 3, and partial light distribution patterns P1R to P4R of the light distribution pattern HPA for high beam, which are reflected and formed on the divergent scattering reflection surfaces 31D to 34D of the four segments on the lower side of the reflector 3, are substantially transversely symmetrical to the reference optical axis Z of the reflection surfaces 31U to 34D (the vertical line VU-VD from the top to the bottom of a screen in FIG. 7). Therefore, the vehicle headlamp 1 in the embodiment is capable of reliably forming an approximately ideal light distribution pattern HPA for high beam (including the high luminous intensity area SPA) that is substantially transversely symmetrical to the reference optical axis Z of the reflection surfaces 31U to 34D (the vertical line VU-VD from the top to the bottom of the screen in the FIG. 7) by superimposing (combining) the partial light distribution patterns P1L to P4L of the light distribution pattern HPA for high beam, which are reflected and formed on the convergent scattering reflection surfaces 31U to 34U of the four segments on the upper side of the reflector 3, and the partial light distribution patterns P1R to P4R of the light distribution pattern HPA for high beam, which are reflected and formed on the divergent scattering reflection surfaces 31D to 34D of the four segments on the lower side of the reflector 3, with each other.

The vehicle headlamp 1 in the embodiment is provided in such a manner that a solid angle of light from the light emitting chip 21 of the semiconductor-type light source 2, which is incident to the first reflection surfaces 31U and 31D on the upper and lower sides of the first segment that is the most proximal to the light emitting chip 21 of the semiconductor-type light source 2 is great; and therefore, it is optimal to form the light distribution patterns P1L and P1R of an entire external shape of the light distribution pattern HPA for high beam by significantly scattering the light from the light emitting chip 21 of the semiconductor-type light source 2 on the first reflection surfaces 31U and 31D on the upper and lower sides of the first segment. In addition, the vehicle headlamp 1 in the embodiment is provided in such a manner that a solid angle of light from the light emitting chip 21 of the semiconductor-type light source 2, which is incident to the fourth reflection surfaces 34U and 34D on the upper and lower sides of the fourth segment that is distant from the light emitting chip 21 of the semiconductor-light source 2, is small in comparison with the solid angle of the light from the light emitting chip 21 of the semiconductor-type light source 2, which is incident to the first reflection surfaces 31U and 31D on the upper and lower sides that are the most proximal to the light emitting chip 21 of semiconductor-type light source 2; and therefore, it is optimal to form light distribution patterns P4L and P4R of the high luminous intensity area SPA of the light distribution pattern HPA for high beam by less significantly scattering and concentrating the light from the light emitting chip 21 of the semiconductor-type light source 2 on the fourth reflection surfaces 34U and 34D on the upper and lower sides of the fourth segment. Further, the vehicle headlamp 1 in the embodiment is provided in such a manner that a slid angle of light from the light emitting chip 21 of the semiconductor-type light source 2, which is incident to the second reflection surfaces 32U and 32D on the upper and lower sides of the second segment and the third reflection surfaces 33U and 33D on the upper and lower sides of the third segment between the first reflection surfaces 31U and 31D on the upper and lower sides of the first segment that is the most proximal to the light emitting chip 21 of the semiconductor-type light source 2 and the fourth reflection surfaces 34U and 34D on the upper and lower sides of the fourth segment that is the most distant from the light emitting chip 21 of the semiconductor-type light source 2 is small in comparison with a solid angle of the light from the light emitting chip 21 of the semiconductor-type light source 2, which is incident to the first reflection surfaces 31U and 31D on the upper and lower sides of the first segment that is the most proximal to the light emitting chip 21 of the semiconductor-type light source 2, and is great in comparison with a solid angle of the light from the light emitting chip 21 of the semiconductor-type light source 2, which is incident to the fourth reflection surfaces 34U and 34U on the upper and lower sides of the fourth segment that is the most distant from the light emitting chip 21 of the semiconductor-type light source 2; and therefore, it is optimal to form intermediate light distribution patterns P2L, P2R and P3L, P3R connecting the light distribution patterns P1L and P1R of the entire external shape and the light distribution patterns P4L and P4R of the high luminous intensity area SPA to each other by scattering the light from the light emitting chip 21 of the semiconductor-type light source 2 on the second reflection surfaces 32U and 32D on the upper and lower sides of the second segment and on the third reflection surfaces 33U and 33D on the upper and lower sides of the third segment in such a manner as to be less significantly than the light distribution patterns P1L and P1R of the entire external shape and in such a manner as to be more significant than the light distribution patterns P4L and P4R of the high luminous intensity area SPA.

The vehicle headlamp 1 in the embodiment is provided in such a manner that among the upper and lower reflection surfaces of the four segments of the reflector 3, on the upper side, convergent scattering reflection surfaces 31U to 34U are disposed in all of the four segments, and on the lower side, divergent scattering reflection surfaces 31D to 34D are disposed in all of the four segments; and therefore, the upper and lower reflection surfaces of the four segments adjacent to each other in the normal direction (the transverse direction) of the X axis direction are continuous as the upper convergent scattering reflection surfaces 31U to 31D and the lower divergent scattering reflection surfaces 31D to 34D, respectively.

Hence, the vehicle headlamp 1 in the embodiment is capable of smoothly and continuously configuring the four segments without a loss of the light from the light emitting chip 21 of the semiconductor-type light source 2.

(Description of Examples Other Than Embodiment)

It is to be noted that in the foregoing embodiment, among the four segments of the reflector 3, all of the upper reflection surfaces are employed as the convergent scattering reflection surfaces 31U to 34U, and all of the lower reflection surfaces are employed as the divergent scattering reflection surfaces 31D to 34D. However, in the present invention, conversely, among the four segments of the reflector 3, all of the upper reflection surfaces may be employed as the divergent scattering reflection surfaces 31D to 34D and all of the lower reflection surfaces may be employed as the convergent scattering reflection surfaces 31U to 34U.

In addition, in the foregoing embodiment, among the four segments of the reflector 3, all of the upper reflection surfaces are employed as the convergent scattering reflection surfaces 31U to 34U and all of the lower reflection surfaces are employed as the divergent scattering reflection surfaces 31D to 34D. However, in the present invention, among the reflection surfaces on the upper and lower sides of a respective one of the segments, either one (an upper side or a lower side) may be employed as a convergent scattering reflection surface, and the other one (the lower side or the upper side) may be employed as a divergent scattering reflection surface. In this case, the convergent scattering reflection surface and the divergent scattering reflection surface may be adjacent to each other in the normal direction (the transverse direction) of the X axis direction.

Further, in the foregoing embodiment, the reflection surfaces 31U to 34D on the upper and lower sides of the reflector 3 are vertically divided into four segments with respect to the normal direction (the transverse direction) of the X axis direction. However, in the present invention, the reflection surfaces on the upper and lower sides of the reflector may be divided into three segments or five or more segments.

Furthermore, in the foregoing embodiment, the reflection surfaces 31U to 34D on the upper and lower sides of the reflector 3 are divided into four segments that have their related boundaries, and the first reflection surfaces 31U and 31D to the fourth reflection surfaces 34U and 34D are provided. However, in the present invention, a reflection surface adapted to form a light distribution pattern of an entire external shape, a reflection surface adapted to form an intermediate light distribution pattern, and a reflection surface adapted to form a light distribution pattern of a high luminous intensity area may be smoothly and continuously provided in place of dividing the reflection surfaces on the upper and lower sides of the reflector by a plurality of segments that have their related boundaries.

What is claimed is:

1. A vehicle headlamp comprising:
   a semiconductor-type light source; and
   a reflection surface adapted to reflect light from the semiconductor-type light source and emit the reflected light forward of a vehicle in a predetermined light distribution pattern,
   wherein the semiconductor-type light source is disposed at or near a reference focal point of the reflection surface,
   wherein the reflection surface is divided into reflection surfaces on upper and lower sides in a direction in which the light from the semiconductor-type light source is to be radiated, with respect to a normal line passing through a center of the semiconductor-type light source or proximity thereof, wherein either one of the reflection surfaces on the upper and lower sides is a convergent scattering reflection surface, and the other one is a divergent scattering reflection surface, wherein among the reflection surfaces on the upper and lower sides, the reflection surfaces on the upper and lower sides that are proximal to the semiconductor-type light source are reflection surfaces adapted to form a light distribution pattern of an entire external shape of the predetermined light distribution pattern, and wherein among the reflection surfaces on the upper and lower sides, the reflection surfaces on the upper and lower sides that are distant from the semiconductor-type light source are reflection surfaces adapted to form a light distribution pattern of a high luminous intensity area of the predetermined light distribution pattern.

2. The vehicle headlamp according to claim 1, wherein among the reflection surfaces on the upper and lower sides, the reflection surfaces on the upper and tower sides between the upper reflection surfaces that are proximal to the semiconductor-type light source and the upper and lower reflection surfaces that are distant from the semiconductor-type light source are reflection surfaces on which a ratio of forming the light distribution pattern of the high luminous intensity area increases from a ratio of forming the light distribution pattern of an entire external shape as the reflection surfaces are distant from the semiconductor-type light source, 3. A vehicle headlamp comprising:

a semiconductor-type light source; and a reflection surface adapted to reflect light from the semiconductor-type light source and emit the reflected light forward of a vehicle in a predetermined light distribution pattern, wherein the semiconductor-type light source is disposed at or near a reference focal point of the reflection surface, wherein the reflection surface is divided into reflection surfaces on upper and lower sides in a direction in which the light from the semiconductor-type light source is to be radiated, with respect to a normal line passing through a center of the semiconductor-type light source or proximity thereof, wherein either one of the reflection surfaces on the upper and lower sides is a convergent scattering reflection surface, and the other one is a divergent scattering reflection surface, wherein the reflection surfaces on the upper and lower sides are divided into a plurality of segments in such a manner as to be perpendicular to the normal line, wherein among the plurality of segments, the reflection surfaces on the upper and lower sides of a segment that is the most proximal to the semiconductor-type light source are reflection surfaces adapted to form a light distribution pattern of an entire external shape of the predetermined light distribution pattern, and wherein among the plurality of segments, the reflection surfaces on the upper and lower sides of a segment that is the most distant from the semiconductor-type light source are reflection surfaces adapted to form a light distribution pattern of a high luminous intensity area of the predetermined light distribution pattern.

4. The vehicle headlamp according to claim 3, wherein either one of the reflection surfaces on the upper and lower sides of the plurality of segments is a convergent scattering reflection surface in all of the segments, and the other one is a divergent scattering reflection surface in all of the segments.

5. The vehicle headlamp according to claim 3, wherein among the plurality of segments, the reflection surfaces on the upper and tower sides of a segment between the segment that is the most proximal to the semiconductor-type light source and the segment that is the most distant from the semiconductor-type light source are reflection surfaces adapted to form an intermediate light distribution pattern connecting the light distribution pattern of the entire external shape and the light distribution pattern of the high luminous intensity area to each other.

* * * * *